May 24, 1949.  C. M. ASBILL, JR  2,471,055
DISPENSING APPARATUS

Filed Feb. 14, 1945  8 Sheets-Sheet 1

FIG. 1

INVENTOR
CLARENCE M. ASBILL, JR.
BY: *Pennie Davis Marvin Edmonds*
ATTORNEYS

FIG. 2

INVENTOR
CLARENCE M. ASBILL, JR.
BY: *[signature]*
ATTORNEYS

May 24, 1949. C. M. ASBILL, JR 2,471,055
DISPENSING APPARATUS
Filed Feb. 14, 1945 8 Sheets-Sheet 3

FIG. 3

INVENTOR
CLARENCE M. ASBILL JR.
BY *Pennie Davis Marvin Edmonds*
ATTORNEYS

Fig 4

May 24, 1949. C. M. ASBILL, JR 2,471,055
DISPENSING APPARATUS

Filed Feb. 14, 1945 8 Sheets-Sheet 6

FIG. 6

INVENTOR
CLARENCE M. ASBILL JR.
BY: *Pennie Davis Marvin Edmonds*
ATTORNEYS

May 24, 1949. C. M. ASBILL, JR 2,471,055
DISPENSING APPARATUS
Filed Feb. 14, 1945 8 Sheets-Sheet 7

INVENTOR
CLARENCE M. ASBILL, JR.
BY
ATTORNEYS

May 24, 1949.  C. M. ASBILL, JR  2,471,055
DISPENSING APPARATUS

Filed Feb. 14, 1945  8 Sheets-Sheet 8

INVENTOR
CLARENCE M. ASBILL, JR.
BY:
ATTORNEYS

Patented May 24, 1949

2,471,055

UNITED STATES PATENT OFFICE 2,471,055

DISPENSING APPARATUS

Clarence M. Asbill, Jr., La Grange, Ga., assignor, by mesne assignments, to Callaway Mills Company, La Grange, Ga., a corporation of Georgia Application February 14, 1945, Serial No. 577,800

12 Claims. (Cl. 194—4)

This invention relates to apparatus for dispensing a plurality of articles one by one, and is concerned more particularly with a novel dispensing apparatus serving also as a collecting means for articles, which may be of the same type as those dispensed or different. The new apparatus is especially adapted for dipensing and collecting articles, such as towels, and an embodiment of the invention for that use will be illustrated and described in detail for purposes of explanation. It will be readily apparent, however, that the utility of the invention is not limited to that specific application.

At the present time, towels are used in large numbers in various manufacturing plants and other places of business, and, if no supervision of the distribution and collection of such towels were provided, a large number would be lost. However, any check system that requires manpower is unsatisfactory not only because of its cost but also because of the undesirability of using labor for such a purpose.

The present invention is, accordingly, directed to the provision of a dispensing apparatus which serves both to distribute towels and also to provide the check system above mentioned, in that the apparatus cannot be operated to deliver a towel until another towel has been deposited therein. A person having a towel in his possession may, accordingly, not obtain a clean one from the machine, until he deposits the first towel therein, and this insures that used towels will be collected as the clean ones are dispensed.

For a better understanding of the invention, reference may be had to the accompanying drawings, in which.

The new apparatus in the form illustrated comprises a cabinet generally designated 20 which is made up of vertical and horizontal frame members 20a and cross bars 20b. The cabinet is closed by panels 21 in the front, back, and top, and by removable panels or doors 22 at the sides, the doors being provided with locks 23 to prevent unauthorized access to the interior of the cabinet. In the front of the cabinet there is an inlet opening 24 near the top and an outlet opening 25 at a lower level. A crank 26 mounted on a shaft 27 lies outside the front of the cabinet, the shaft extending through an opening in one of the front panels to the interior of the cabinet.

Figure 1:
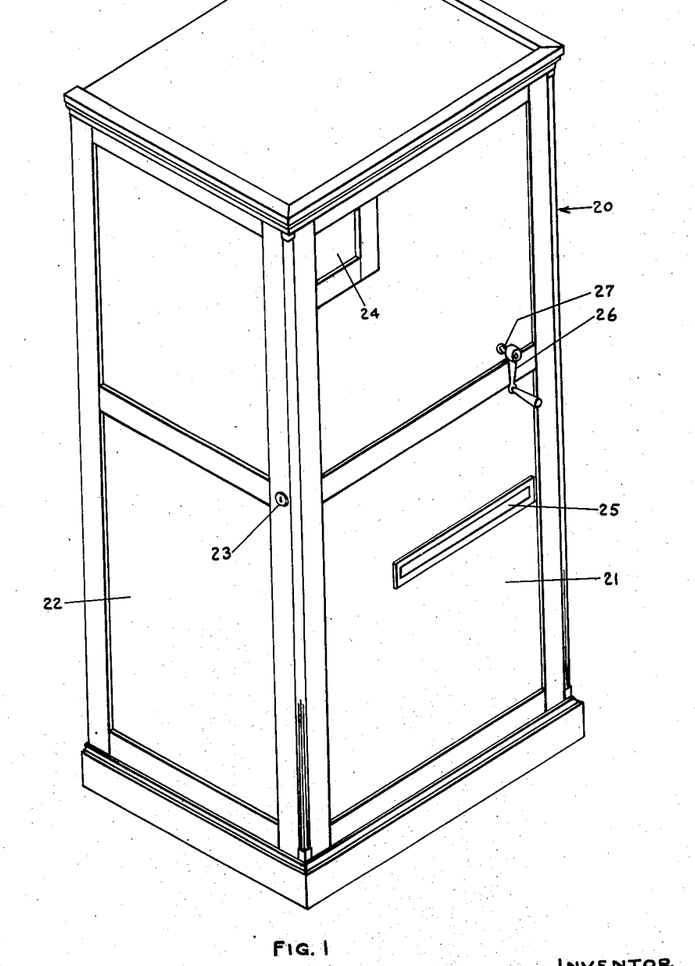
Fig. 1 is a view in perspective of the exterior of the apparatus.
Figure 2:
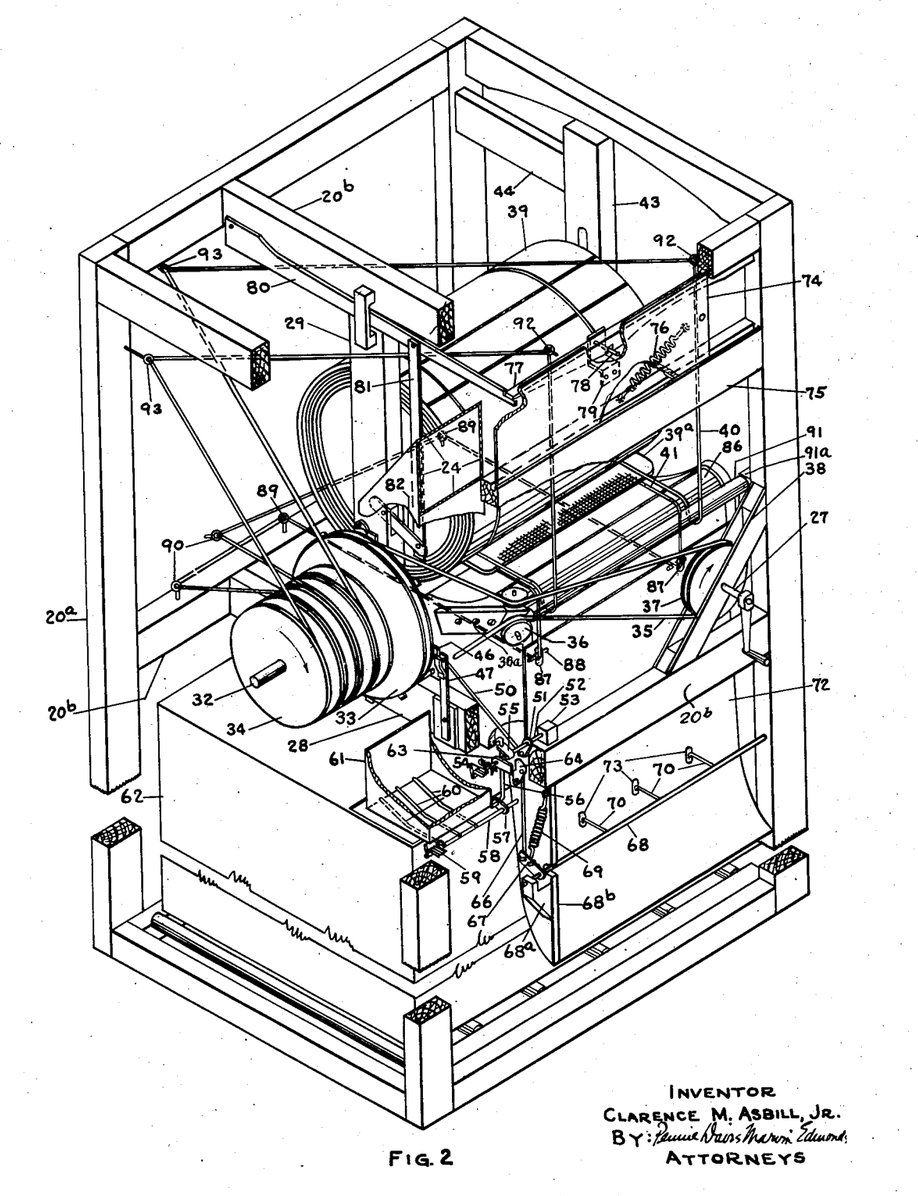
Fig. 2 is a front perspective view of the apparatus with parts of the cabinet removed and parts of the mechanism broken away.
Figure 4:
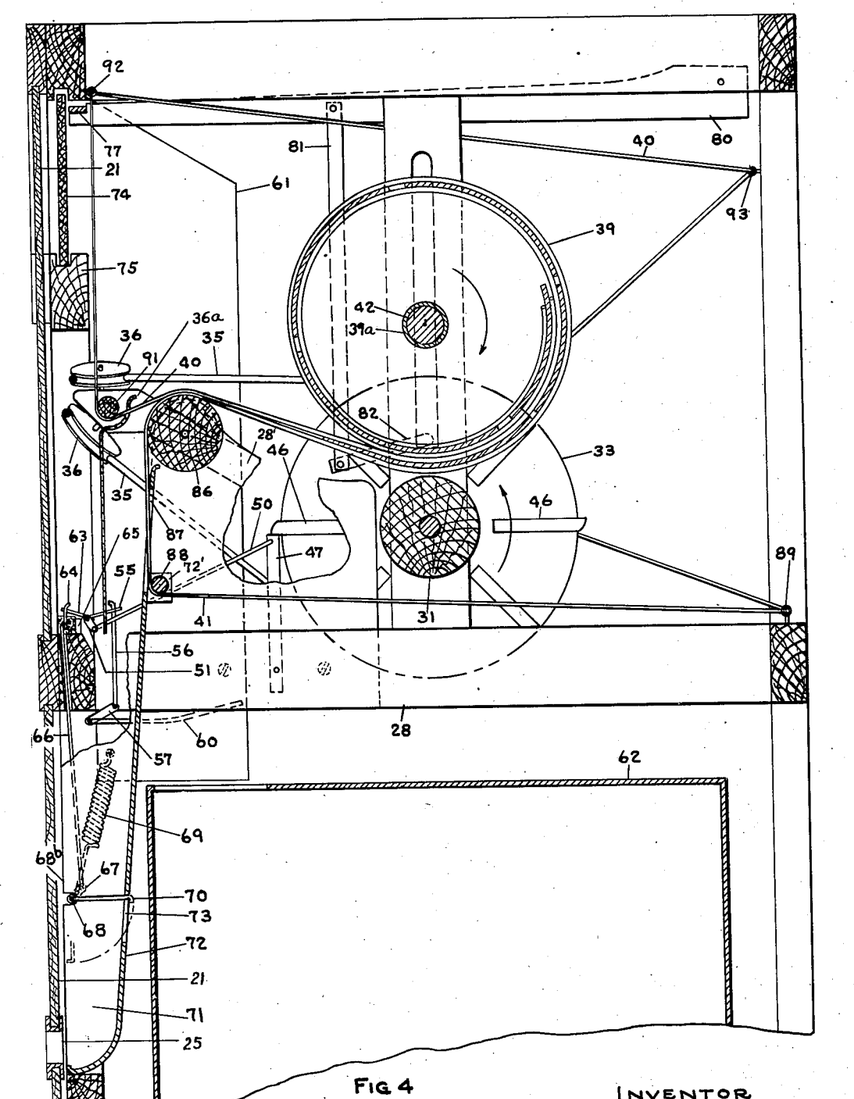
Fig. 4 is a vertical sectional view through the apparatus.

A pair of cross bars 28 extends from front to rear of the frame structure of the machine and an upright bar 29 is mounted on one cross bar and a block 30 is mounted on the other. A roller 31 is mounted between bar 29 and block 30 on a shaft 32 supported for rotation in openings in the bar and block. The shaft projects through bar 29 and on its projecting end carries a pulley 33 and four spools 34. The pulley is fixed in position on the shaft, but the spools are held thereon frictionally. A belt 35 is trained about pulley 33 and passes around rotary guides 36 mounted on one end of a bar 36a (Figs. 2, 4), the other end of which is secured to one of a pair of upright panels 28', each of which is attached to a vertical face of one of the cross bars 28. From the guides 36, the belt passes around pulley 37 mounted on shaft 27. Shaft 27 is supported for rotation in bars 38 extending between upright and horizontal members of the framework. Upon rotation of shaft 27 by the crank 26, the pulley 33, roller 31 and spools 34 are rotated.

The towels are supplied to the machine in the form of a roll 39 in which the towels lie end to end between upper and lower control elements wound with the towels, and illustrated as pairs of upper and lower strands 40, 41, respectively, a pair of strands lying near each end of the roll. The strands may be yarns, cords, wires, or the like, and they serve to hold the towels together so that they can be rolled up, and also as a means for directing a towel being dispensed on its way to the outlet. The roll of towels, wound on a paper tube 39a, is placed on a metal arbor 42, and when the roll is in place in the machine, the ends of the arbor are received in vertical slots in the upright bar 29 and a bar 43, respectively. The bar 43, when in operative position, rests upon the top of block 30 and is attached to arms 44 hinged at 45 to a vertical member of the framework so that the bar can be swung away from bar 29 to facilitate the insertion of the roll of towels. The roll, when in place between bars 29 and 43, rests on top of roller 31 so as to be rotated thereby.

Figures 5, 5A:
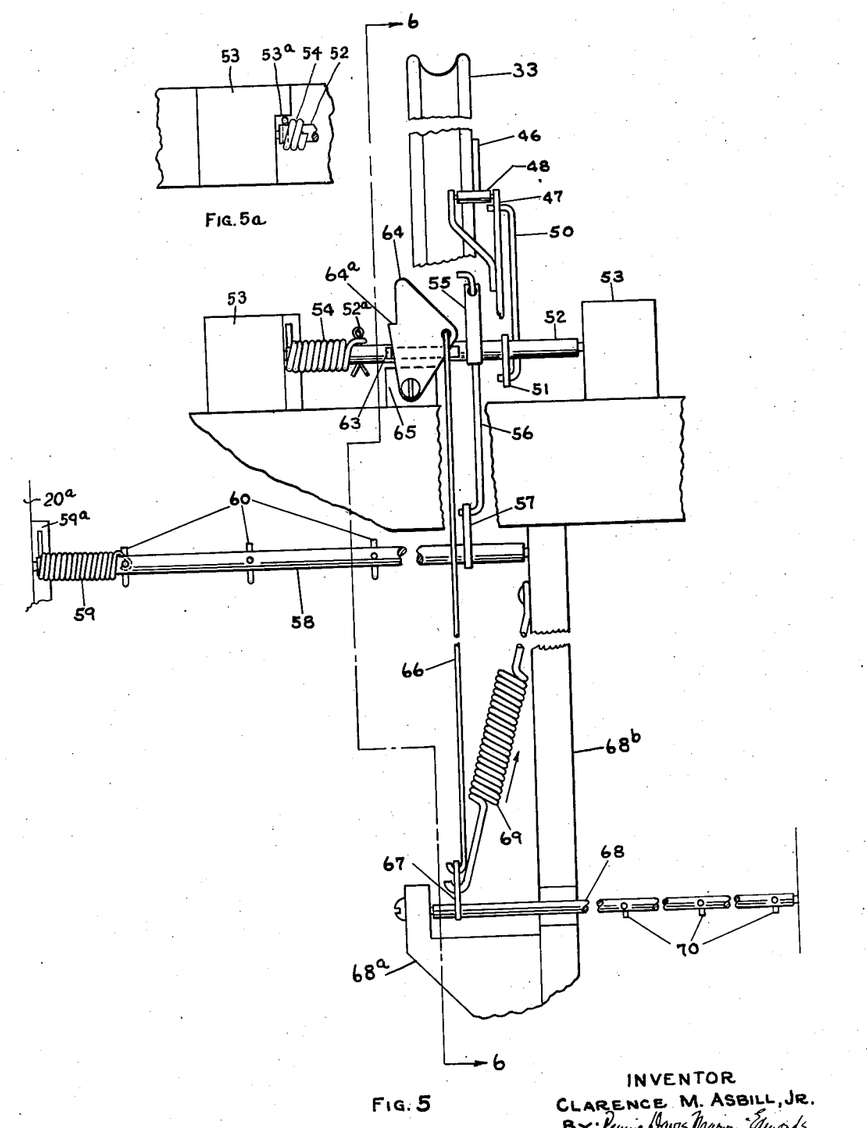
Fig. 5 is a view in front elevation of a part of the apparatus on an enlarged scale.
Fig. 5a is a plan view of parts shown in Fig. 5.

The pulley 33 is formed on one face with projecting radial arms 46, and a yoke 47 (Figs. 5, 6) carrying a roller 48 between its ends is mounted pivotally on a cross bar 28 in such manner that the yoke may be swung to place roller 48 in position to be engaged by one or the other of the arms 46. The yoke is connected by a link 50 to an arm 51 fast on a shaft 52 journalled in blocks 53 mounted on the framework. A spring 54 encircles shaft 52 and is connected at one end to the shaft, as by means of a cotter pin 52a. At its other end, the spring bears against a shoulder 53a (Fig. 5a) formed on one of the blocks 53. The spring tends to rotate the shaft so as to swing arm 51 to cause yoke 47 to be rocked so that its roller 48 lies beneath an arm 46 on the pulley 33.

Shaft 52 is also provided with an arm 55 having an opening at its end through which passes the hooked end of a link 56. The link is connected at its lower end to an arm 57 fast on a shaft 58 journalled at one end in an upright frame member 20a and at the other end in a vertical partition member 68b mounted to extend between cross bars 20b of the framework. A spring 59 encircles shaft 58 and is secured thereto at one end in any suitable manner. At its other end, the spring bears against a block 59a (Fig. 5) attached to the frame member 20a in which shaft 58 is journalled. The spring tends to rotate the shaft to swing arm 57 upwardly and move the link 56 so that its upper hooked end is out of contact with arm 55. Shaft 58 is provided with a plurality of arms 60 which project through the wall of a chute 61 which leads downwardly from the inlet opening 24 of the cabinet and terminates just above an opening in a receptacle 62 which rests on bottom cross bars of the framework.

Shaft 52 is provided with another arm 63 which lies adjacent a locking plate 64 pivotally mounted on a block 65 attached to one of the frame members. Plate 64 is connected by a link 66 to an arm 67 fast on a shaft 68 journalled at one end in a block 68a attached to partition 68b and at the other end in a vertical frame member. A spring 69 attached to arm 67 and to the partition 68b tends to swing the arm upwardly so as to rock plate 64 counterclockwise on its pivot, as viewed in Fig. 5. Shaft 68 is provided with a plurality of fingers 70 which extend across a passage 71 leading to the outlet opening 25. The passage is defined at one side by partition 68b and at the rear by a plate 72 and the fingers 70 extend through slots 73 in the plate and normally engage the tops of the slots so as to limit the rocking of shaft 68.

A door 74 is mounted in a slot in a cross bar 75 at the top of the front of the cabinet and is urged by a spring 76 to a position in which it shuts off the opening 24. The door can be latched in position away from opening 24 by a spring member 77 attached to the framework and having a slot in its under surface in which may be received a pin 78 mounted at one end in a bracket 79 attached to the door, and at the other end in the door itself. A lever 80 is pivoted on the framework with its free end lying beneath the free end of spring member 77. The lever is connected by a link 81 to a lever 82 pivoted in an opening in the upright member 29 and lying with one end in the vertical slot in the upright, in which the end of the towel arbor 42 is received. When the roll of towels has become exhausted, the end of the arbor in the slot will have depressed one end of lever 82 and thereby caused an upward movement of lever 80 and a similar upward movement of spring member 77, so that the latter becomes disengaged from pin 78. Thereupon, spring 76 will move door 74 in its slot to a position in which it closes the inlet opening 24.

When the door 74 is in position to close the inlet opening, it is held there by a lock consisting of a block 83 which has an angularly cut under surface and rests at one edge against the inner surface of door 74 and also along one edge on the cross bar in which the door is mounted. The block is formed with conical openings 84 through which extend pins 85 mounted in the cross bar. The location of the block 83 is such that, when the door 74 is moved by its spring to the end of its path of travel, the rear end of the door passes beyond the block, whereupon the block drops down so that its under surface lies flat against the cross bar. In this position, a portion of the block lies to the rear of the back edge of the door in position to block return movement of the door.

Figure 3:
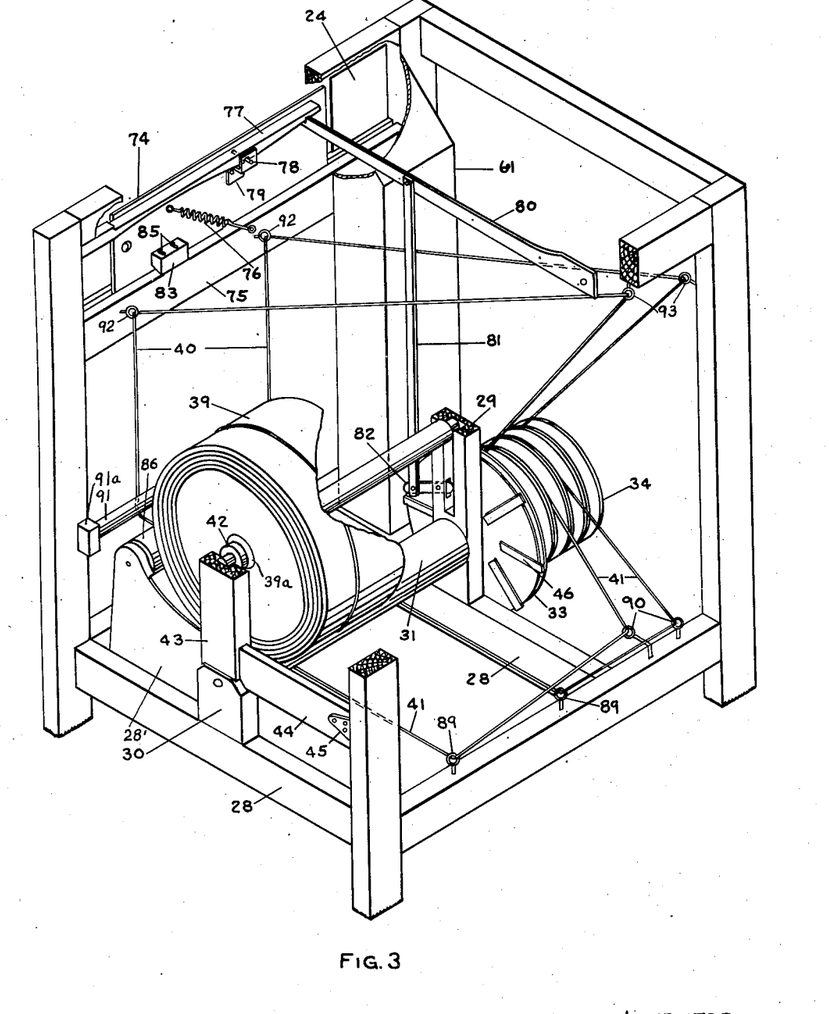
Fig. 3 is a rear perspective view with parts of the cabinet removed and parts of the mechanism broken away.

To place the machine in operative condition, a roll of towels is mounted upon the roller 31 with the ends of the roll arbor received in the slots in members 29 and 43. The cords 40, 41, between which the individual towels 39a lie, are then led forward from the bottom of the roll to pass over a roller 86 supported for rotation in the upright panels 28 previously described. The bottom cords 41 are then led downwardly to pass through slots 87 in the plate 72 and thence around respective guide rollers 88 mounted in ears 72' (Fig. 4) struck from plate 72. The cords then pass through guides 89 and 90 to their respective spools 34. The upper cords 40 pass from roller 86 beneath a guide roller 91 journalled at one end in bar 36a and at the other end in a block 91a (Figs. 2, 3) attached to one of the vertical frame members 20a. From the guide roller 91, cords 40 pass through guides 92 and 93 to their respective spools 34.

Figure 6:
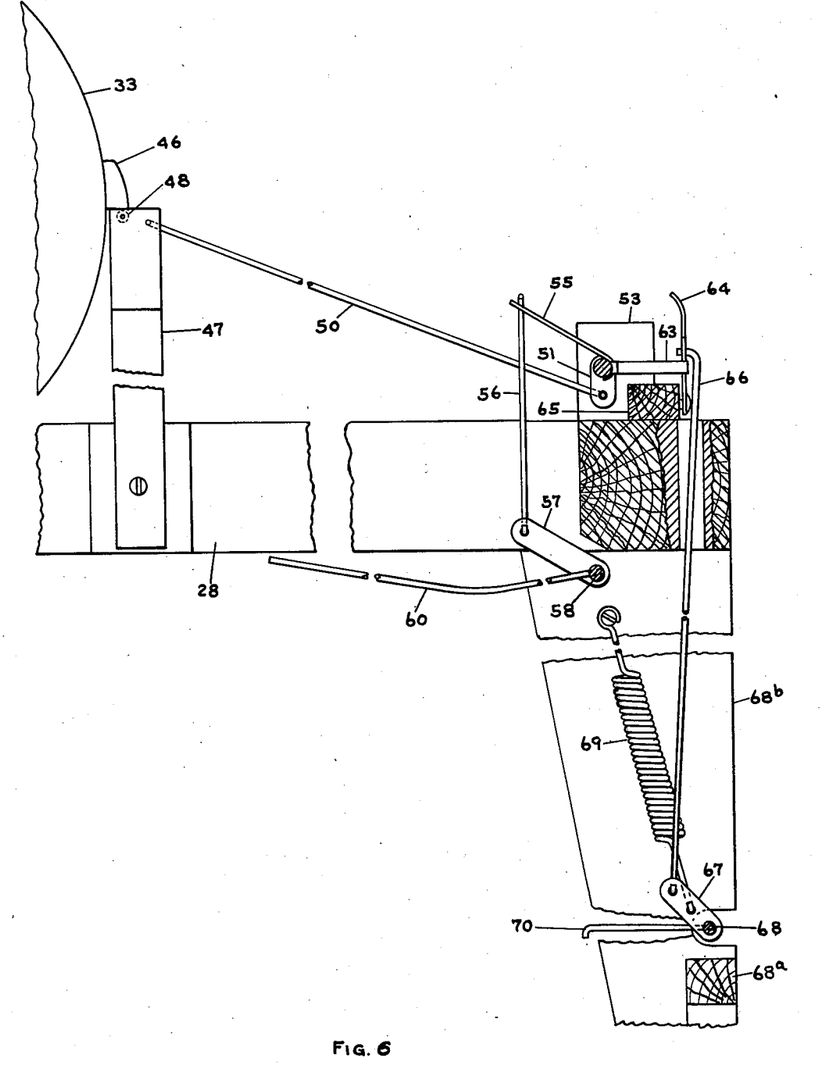
Fig. 6 is a sectional view on the line 6—6 of Fig. 5.
Figure 7:
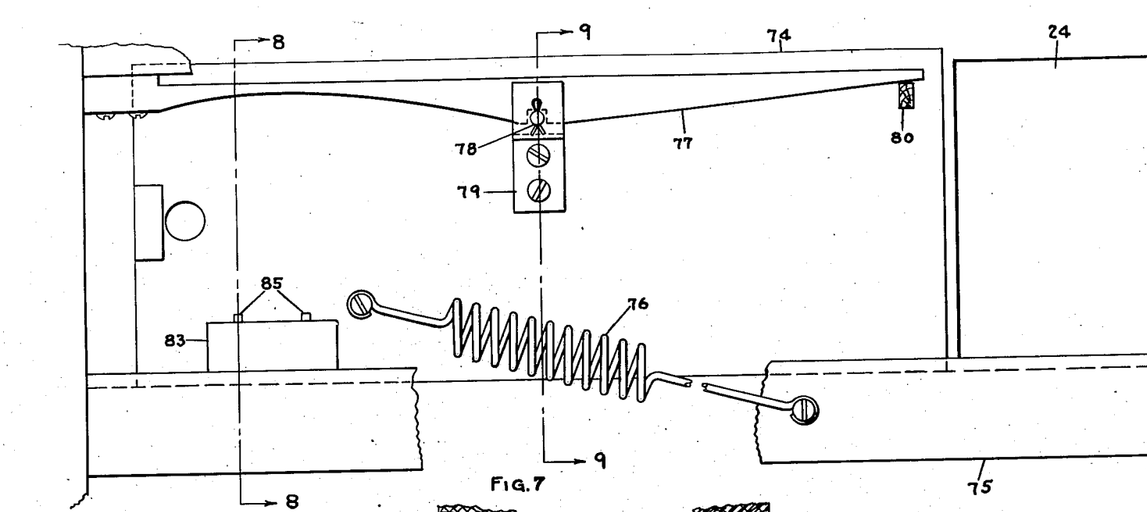
Fig. 7 is a rear view of a door used in the apparatus.
Figure 8:
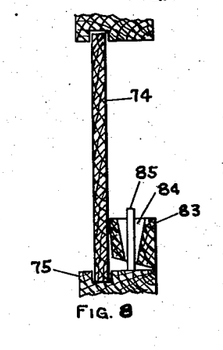
Figs. 8 and 9 are sectional views on the lines 8—8 and 9—9, respectively, of Fig. 7.
Figure 9:
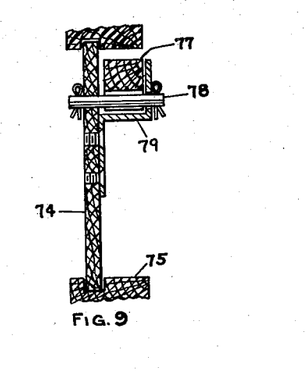
Figure 10:
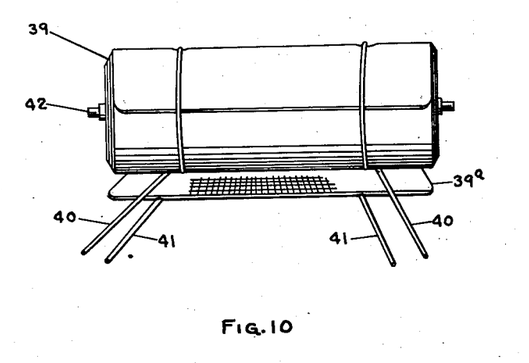
Fig. 10 is a view in front elevation of a roll of towels used in the apparatus.
Figure 11:
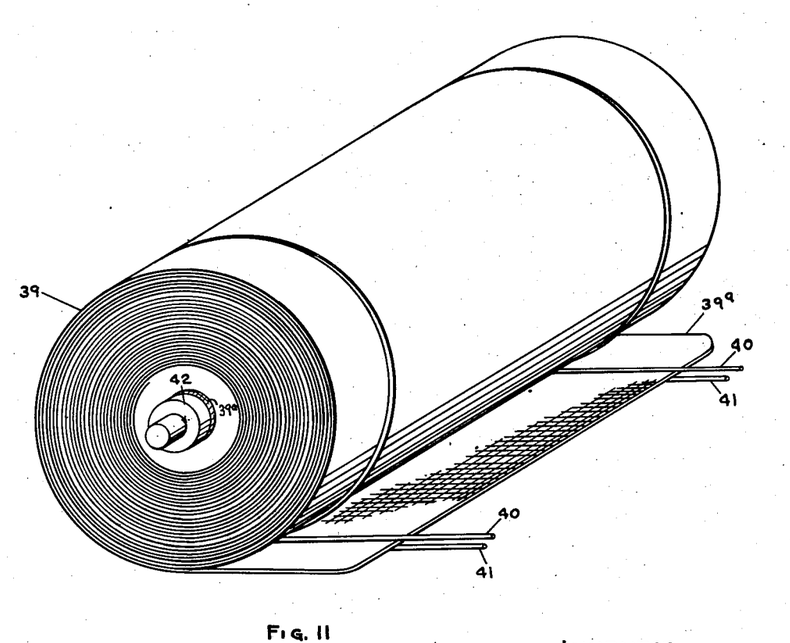
Fig. 11 is a perspective view of the roll of towels.

With the towel roll in position and its cords started on spools 34, as described, the apparatus is locked against the delivery of a towel by reason of the engagement of an arm 46 on pulley 33 with roller 48 in yoke 47. The yoke is held in this position by the action of spring 54 which tends to rock shaft 52 in such direction that link 50 swings yoke 47 toward the rim of the pulley. In order that the machine may be operated to dispense a towel, yoke 47 must be moved forwardly to free its roller 48 from arm 46, and this can be accomplished by the insertion of a towel through the inlet opening 24. A towel so inserted drops through chute 61 and strikes fingers 60, causing the fingers to move down and to rock shaft 58 against the action of its spring 59. As the shaft rocks in a counterclockwise direction, as seen in Fig. 6, arm 57 swings downwardly, and this causes link 56 to engage and swing arm 55 on shaft 52 downwardly. The rocking of shaft 52 causes a pull on link 50, which swings yoke 47 to move its roller 48 from beneath arm 46.

As shaft 52 is rocked as above described, the arm 63 thereon moves up the edge of locking plate 64 until it passes the lower edge of the notch 64a therein. The locking plate then swings slightly to the left (Fig. 5) so that arm 63 rests in the notch in the plate and the plate prevents movement of shaft 52 by its spring. When the towel inserted through the inlet opening has passed fingers 60, spring 59 restores shaft 58 to its original position, and this causes an upward movement of arm 57 and link 56. The link, however, slides freely through the opening in arm 55 on shaft 52, and shaft 52 remains in the position in which it is locked by engagement of arm 63 with notch 64a in the locking plate.

When yoke 47 has been moved to free its roller 48 from engagement with arm 46, the crank handle 26 may be rotated, and this causes pulley 33, spools 34, and roller 31 to be rotated. The towel roller 39 is turned in the unwinding direction, and a towel 39a is advanced between cords 40, 41 over roller 86. At the top of the roller, cords 40 and 41 separate and the towel is released to drop down through the passage 71. As the towel moves downward through the passage, it strikes the fingers 70 and causes them to swing downward. This movement of the fingers causes shaft 68 to be rocked against the action of its spring 69, and also causes arm 67 to pull down on link 66. This causes plate 64 to be swung, so that arm 63 on shaft 52 is released from the notch in the plate. Shaft 52 is then rocked by its spring 54, and this causes yoke 47 to be swung toward the rim of pulley 33 and to a position in which roller 48 in the yoke lies in the path of an arm 46 on the pulley. When the roller is in that position, the pulley is held against further rotation.

When the towels in the roll have been completely dispensed, the engagement of the towel roll arbor 42 with lever 82 causes door 74 to be released to close the inlet opening 24. The machine is then inoperative until a new supply of towels has been placed in position. For this purpose, the door at one side of the cabinet is unlocked to afford access to the interior of the cabinet. The arm 44 with vertical member 43 attached thereto is then swung outwardly, and the arbor of the roll that has been used up is removed and a new roll placed in position with one end of its arbor received in the slot in upright 29. Arm 44 is then swung back to cause the insertion of the other end of the towel arbor in the slot in member 43. When the towels in a roll have been completely dispensed, its cords remain threaded about the guide bars and through the guides on their way to their spools 34. Accordingly, when the new roll has been placed in position, its cords may be tied to the ends of the cords of the preceding roll, and it is not necessary to thread the new cords around the guide bars and through the guides.

From time to time, when spools 34 are full, it is necessary to remove the cords wound thereon. For this purpose, the spools, which are frictionally mounted on shaft 32, may be removed, the cords unwound, and the spools replaced, or the full spools may be replaced by a set of empty ones and the unwinding operation done at some other time.

The claims are:

1. A dispensing apparatus which comprises means for rotatably supporting a roll of towels, means for rotating the roll to dispense towels therefrom, means biased to lock the supporting means against rotation, means operable by a towel deposited thereon to put the locking means out of operation, means for holding the locking means inoperative, and means operable by a towel being dispensed for releasing the holding means.

2. A dispensing apparatus which comprises means for rotatably supporting a roll of towels, means for rotating the roll to dispense towels therefrom, means normally locking the supporting means against rotation, means operable by a towel deposited thereon to put the locking means out of operation, and means operable by a part of the roll of towels when the supply of towels is exhausted for cutting off access to the means operable by a towel deposited thereon.

3. A dispensing apparatus which comprises means for rotatably supporting a roll of towels, means for rotating the roll to dispense towels therefrom, means biased to lock the supporting means against rotation, means operable by a towel deposited thereon to put the locking means out of operation, means for holding the locking means inoperative, means operable by a towel being dispensed for releasing the holding means and means operable by a part of the roll of towels when the supply of towels is exhausted for cutting off access to the means operable by a towel deposited thereon.

4. A dispensing apparatus for towels, which comprises a support for a roll of towels, means for rotating the support to dispense towels from the roll, means normally holding the support against rotation, a receptacle for soiled towels, a passage leading thereto, and means actuated by a soiled towel on its way through the passage and operating to put the holding means out of action.

5. A dispensing apparatus for towels, which comprises a support for a roll of towels, means for rotating the support to dispense towels from the roll, means biased to lock the supporting means against rotation, a receptacle for soiled towels, a passage leading thereto, means actuated by a soiled towel on its way through the passage and operating to put the locking means out of action, means for holding the locking means inoperative, a passage for discharge of the dispensed towel, and means in the discharge passage operable by a towel passing therethrough for releasing the holding means.

6. A dispensing apparatus for towels, which comprises a support for a roll of towels, means for rotating the support to dispense towels from the roll, means normally engaging a part of the rotating means to hold it against rotation of the support, a receptacle for soiled towels, a passage leading thereto, and means within the passage operable by a soiled towel on its way to the receptacle for freeing the holding means from the rotating means.

7. A dispensing apparatus for towels, which comprises a support for a roll made up of towels lying between pairs of strands and wound therewith, means for rotating the support to dispense towels from the roll, means for taking up the strands as the roll is unwound, means normally locking the rotating means against operation, a passage into which soiled towels may be introduced, and means operated by a towel moving through the passage for releasing the locking means.

8. A dispensing apparatus for towels, which comprises a support for a roll made up of towels lying between pairs of strands and wound therewith, means for rotating the support to dispense towels from the roll, means for taking up the strands as the roll is unwound, means biased to lock the rotating means against operation, a passage into which soiled towels may be introduced, means operated by a towel moving through the passage for rendering the locking means inoperative, means for holding the locking means inoperative, and means operated by a towel being dispensed for putting the holding means out of action.

9. A dispensing apparatus for towels, which comprises a support for a roll made up of towels lying between pairs of strands and wound therewith, means for rotating the support to dispense towels from the roll, means for taking up the strands as the roll is unwound, means biased to lock the rotating means against operation, a passage into which soiled towels may be introduced, means operated by a towel moving through the passage for rendering the locking means inoperative, means for holding the locking means inoperative, means operated by a towel being dispensed for putting the holding means out of action, and means operable by part of the roll when the supply of towels therein is exhausted for shutting off access to the passage.

10. A dispensing apparatus for towels, which comprises a cabinet having an inlet opening and an outlet opening, a supply of towels within the cabinet, a rotatable support within the cabinet for the towel supply, means operable from outside the cabinet for rotating the support to discharge a towel therefrom and advance it toward the outlet opening, means within the cabinet normally holding the support against rotation, a chute inside the cabinet for conducting a towel inserted through the inlet opening to a place of deposit, and means within the cabinet for releasing the towel support from the holding means, said releasing means including an actuating member operated by a towel passing through the chute.

11. A dispensing apparatus for towels, which comprises a cabinet having an inlet opening and an outlet opening, a supply of towels within the cabinet, a rotatable support within the cabinet for the towel supply, means operable from outside the cabinet for rotating the support to discharge a towel therefrom and advance it toward the outlet opening, means within the cabinet biased to lock the support against rotation, a chute inside the cabinet for conducting a towel inserted through the inlet opening to a place of deposit, means within the cabinet for rendering the locking means inoperative, said rendering means including an actuating member moved by a towel passing through the chute, means for holding the locking means inoperative, a passage inside the cabinet for conducting a towel discharged from the roll to the outlet opening, and means including an actuating member operated by a towel moving through the passage, for putting the holding means out of action.

12. An apparatus for dispensing towels, which comprises a rotatable support for a roll made up of towels lying between pairs of strands and wound therewith, means for rotating the support to discharge towels from the roll, means operated by said rotating means for taking up strands unwound from the roll, means biased to lock the rotating means against operation, means actuated by a towel deposited thereon for rendering the locking means inoperative, means for holding the locking means inoperative, means for operating the rotating means, and means operated by a towel discharged from the roll for putting the holding means out of action.

CLARENCE M. ASBILL, Jr.

REFERENCES CITED

The following references are of record in the file of this patent:

UNITED STATES PATENTS

| Number | Name | Date |
|---|---|---|
| 363,031 | Westbrook | May 17, 1887 |
| 732,337 | Clemons | June 30, 1903 |
| 905,401 | Billmeyer | Dec. 1, 1908 |
| 927,656 | Kainer | July 13, 1909 |
| 1,050,594 | Angell | Jan. 14, 1913 |
| 1,197,455 | Dickinson | Sept. 5, 1916 |
| 1,570,909 | Mills | Jan. 26, 1926 |
| 1,570,993 | Cook | Jan. 26, 1926 |
| 1,848,238 | Bihl et al. | Mar. 8, 1932 |
| 2,028,788 | Lane | Jan. 28, 1936 |
| 2,245,841 | Weiss | June 17, 1941 |
| 2,344,715 | Maurer | Mar. 21, 1944 |